(12) United States Patent
Movva et al.

(10) Patent No.: US 8,566,606 B2
(45) Date of Patent: Oct. 22, 2013

(54) APPARATUS AND METHOD FOR PERFORMING TRUSTED COMPUTING INTEGRITY MEASUREMENT REPORTING

(75) Inventors: Sasidhar Movva, Wheatley Heights, NY (US); Richard D. Herschaft, Whitestone, NY (US); Renuka Racha, Kings Park, NY (US); Inyhok Cha, Yardley, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 437 days.

(21) Appl. No.: 12/297,966

(22) PCT Filed: Apr. 23, 2007

(86) PCT No.: PCT/US2007/009713
§ 371 (c)(1),
(2), (4) Date: Aug. 18, 2009

(87) PCT Pub. No.: WO2007/124091
PCT Pub. Date: Nov. 1, 2007

(65) Prior Publication Data
US 2009/0307487 A1    Dec. 10, 2009

Related U.S. Application Data

(60) Provisional application No. 60/794,165, filed on Apr. 21, 2006.

(51) Int. Cl.
*G06F 21/00* (2013.01)
(52) U.S. Cl.
USPC ........... 713/187; 707/687; 707/690; 707/697; 707/698; 707/699
(58) Field of Classification Search
USPC ........................................................ 713/187
See application file for complete search history.

(56) References Cited

U.S. PATENT DOCUMENTS 6,920,436 B2 * 7/2005 Stefik et al. ............... 705/51
2003/0163711 A1   8/2003 Grawrock
(Continued)

FOREIGN PATENT DOCUMENTS

JP    2003-271254 A    9/2003
JP    2005-527019 A    9/2005
(Continued)

OTHER PUBLICATIONS

Van Oorschot et al., Hardware-assisted circumvention of self-hashing software tamper resistance, Apr. 2005, IEEE Transactions on Dependable and Secure Computing, vol. 2, No. 2, pp. 82-92.*

(Continued)

*Primary Examiner* — Taghi Arani
*Assistant Examiner* — Kenneth Chang
(74) *Attorney, Agent, or Firm* — Woodcock Washburn LLP

(57) ABSTRACT

An apparatus and methods that use trusted platform modules (TPM) to perform integrity measurements of multiple subsystems are disclosed. The state of platform configuration registers (PCRs) after boot up are stored as the base state of the system. In another embodiment, and application that is to be verified requests that its state be extended from the base state of the system. When such a request is received, the state of the system is extended directly from the base state PCR contents and not from the system state. In another embodiment, a virtual PCR is used, where such a virtual PCR uses a larger memory space than a conventional TPM provides for a physical PCR, by use of encrypted storage on external, protected memory.

3 Claims, 4 Drawing Sheets

(56) References Cited

U.S. PATENT DOCUMENTS

| | | | |
|---|---|---|---|
| 2003/0188179 A1* | 10/2003 | Challener et al. | 713/193 |
| 2004/0103281 A1 | 5/2004 | Brickell | |
| 2004/0205362 A1* | 10/2004 | Catherman et al. | 713/300 |
| 2005/0033987 A1 | 2/2005 | Yan et al. | |
| 2005/0058294 A1* | 3/2005 | Chen et al. | 380/277 |
| 2005/0120219 A1* | 6/2005 | Munetoh et al. | 713/176 |
| 2005/0141717 A1 | 6/2005 | Cromer et al. | |
| 2005/0177749 A1* | 8/2005 | Ovadia | 713/201 |
| 2005/0187966 A1* | 8/2005 | Iino | 707/102 |
| 2005/0216577 A1* | 9/2005 | Durham et al. | 709/223 |
| 2005/0216736 A1* | 9/2005 | Smith | 713/168 |
| 2005/0251857 A1* | 11/2005 | Schunter et al. | 726/16 |
| 2005/0262571 A1 | 11/2005 | Zimmer et al. | |
| 2005/0268093 A1* | 12/2005 | Proudler | 713/164 |
| 2006/0005009 A1* | 1/2006 | Ball et al. | 713/155 |
| 2006/0015860 A1* | 1/2006 | Liu et al. | 717/162 |
| 2006/0026423 A1* | 2/2006 | Bangerter et al. | 713/164 |
| 2006/0075223 A1 | 4/2006 | Bade et al. | |
| 2006/0212939 A1* | 9/2006 | England et al. | 726/22 |
| 2006/0256108 A1* | 11/2006 | Scaralata | 345/418 |
| 2007/0079120 A1* | 4/2007 | Bade et al. | 713/166 |

FOREIGN PATENT DOCUMENTS

| | | |
|---|---|---|
| JP | 2005-301550 A | 10/2005 |
| JP | 2006-80636 A | 3/2006 |

OTHER PUBLICATIONS

Trusted Computing Group et al., "TCG Specification Architecture Overview passage", TCG Specification Architecture Overview, Trusted Computing Group, Apr. 28, 2008, p. 5, paragraph 4-p. 9, paragraph 4.2.5.1, revision 1.2, U.S.

Maruyama et al., "Software and Systems Engineering Enabling Safe and Secure e-Society", IPSJ Magazine, Information Processing Society of Japan, Apr. 15, 2004, 45(4), 2-10.

Japanese Patent Application No. 2009-506616: Official Notice of Rejection dated Aug. 12, 2011. T.

* cited by examiner

APPARATUS AND METHOD FOR PERFORMING TRUSTED COMPUTING INTEGRITY MEASUREMENT REPORTING

CROSS-REFERENCE TO RELATED APPLICATIONS

This application is the National Stage of International Application No. PCT/US07/09713, filed Apr. 23, 2007 which claims the benefit of U.S. Provisional Application No. 60/794,165, filed Apr. 21, 2006, the disclosures of which are incorporation herein by reference in their entireties.

FIELD OF INVENTION

The present invention is related to trusted computing, (i.e., computer security), across multiple platforms, (i.e., subsystems). More particularly, the present invention relates to apparatus and methods for performing trusted computing integrity measurement reporting.

BACKGROUND

Platform Configuration Registers (PCRs) are memory locations inside a trusted platform module (TPM) that are used to store hashes of data. The TPM memory used for the PCRs may be volatile or non-volatile in nature.

Conventional Trusted Computing Group (TCG) specifications permit Read, Extend and Quote operations on the PCRs, which are performed by the TPM. The Read operation is used to read the value of a given PCR. The Extend operation is used to modify the value of the PCRs by extending the old contents with the new contents. This allows a challenger to see how the final PCR digests were built. The Quote operation is used for integrity reporting where the values of the PCR are encrypted using an attestation identification key (AIK) by the TPM. Attestation in this context refers to an activity of the platform to supply a measure of the trustworthiness of the system to internal or external challengers or requesters of such information. Integrity reporting may be used to determine a platform's current configuration.

When the TPM performs operations to generate integrity metrics, to be later used for verification of the integrity of a piece of code or data that is hashed, the TPM does not simply compute the hash of the most recent value of the target data or code and then input that value to a PCR. Instead, the TPM performs an Extend operation by concatenating the current existing value of the PCR with a new value of a system component to be measured, and performing a secure hash algorithm (SHA) on the concatenated data, and inputs the result in to the target PCR.

Each time a PCR is extended, a log entry is also made in the TCG event log. A TCG event log, also called a stored measurement log (SML), is a log of events that take place on the platform in which a TPM resides. An SML is a log of measured values of a component, (e.g., a piece of code), in a system platform that includes a TPM. The TPM performs a measurement of events, (such as the loading of a particular application software (SW)), that take place in the platform in which the TPM resides. The measurement kernel, which is a trusted part of the platform operating system (OS) that controls the TPM, generates measurement events upon request by the OS. Note that a "measurement event" is not the event that takes place in the platform itself, but rather a term that signifies the activity or event of the "measurement" performed for an event that occur in the platform. An example of such a platform-event would be the reading, into system memory, of a piece of software code. A measurement event consists of two classes of data: 1) measured values—a representation of embedded data or program code; and 2) measurement digests—a SHA hash of those values. Data are scanned by the TPM which generates a message digest. Digests are a snapshot of the machines' operational state. The two data elements, (measured values and measurement digest), are stored separately. The measurement digest is stored in PCRs in the TPM. The measured values may be stored virtually anywhere, typically in an SML, but they have to be stored in an encrypted fashion. In fact, the measured values may not be stored at all, but re-computed whenever the serialized representation is needed. Measurement data describe properties and characteristics of the measured component. The SML contains sequences of related measured values. Each sequence shares a common measurement digest. Measured values are appended to the common measurement digest and re-hashed. This is more commonly referred to as extending the digest. Extending ensures related measured values will not be ignored, and that the order of operations is preserved.

Algebraically, updates to an n-th PCR, at any time t+1, follows as:

$$PCR[n](t+1)=\text{SHA-1}(PCR[n](t)+\text{measured data}(t+1)) \quad \text{Equation (1)}$$

PCR values are temporal and are reset at system reboot. Verification of measurement events requires the re-creation of the measurement digest and a simple comparison of the digest values, (using the PCR value as one of the comparators). TCG does not define data encoding rules for SML contents, but recommends following appropriate standards such as Extensible Markup Language (XML) to ensure broad accessibility.

FIG. 1 shows a conventional TCG attestation procedure, (i.e., protocol), implemented by a system 100 including a challenger 105, a platform agent 110, a TPM 115 and a repository 120.

The challenger 105 requests one or more PCR values from the platform agent 110 (step 125). The platform agent 110 collects SML entries, which are integrity measurement values (step 130). The platform agent 110 requests PCR values from the TPM 115 (step 135). The PCR values are measurement digests of the integrity measurement values, (i.e., signed hash of the integrity measurement values). The TPM 115 signs the PCR values using an AIK (step 140), and sends the signed PCR values to the platform agent 110 (step 145). The platform agent 110 also collects credentials that vouch for the TPM 115 from the repository 120 (steps 150, 155). The platform agent 110 sends the signed PCR values, the SML entries and the credentials to the challenger 105 (step 160). The challenger 105 then verifies the platform configuration (step 165). For the verification, the challenger 105 computes a measurement digest from the received SML entries and compares the computed measurement digest with the PCR values. The challenger 105 also evaluates the platform credentials and checks signatures.

The PCR values are extended every time a new measurement is made, and this information is logged by the TPM 115. This extending ensures that the order of measurements is preserved and that all the measurement values are taken into account. One of the challenges associated with extending the PCR values is that the state of a platform changes when any measurement is performed, so the state of the system might not be accurate if an application that is not relevant to the current application extends the PCRs.

Currently there is no standardized assignment of PCRs to applications other than the PCRs reserved for the boot up process. This can cause situations where more than one application is using the same PCR which is problematic for the reasons outlined below.

For example, if a trusted browser application is loaded before a trusted digital rights management (DRM) application, the state of the system as needed by the DRM application may not match the expected state if both applications make use of the same PCRs. This could potentially result in a failure to load the application as the state of the system is not what it is supposed to be. The challenger for the DRM application will also get information that the browser is running. This compromises the privacy of the user.

For example, FIG. 2 shows a conventional TCG procedure implemented by a system 200 including a first challenger 205, a second challenger 210 and a user device 215 including a platform agent 220 and a TPM 225, whereby different applications extend a PCR from different states, unaware of each other's extend operation. If the first challenger 205 requests the same changes to the PCR values that the second challenger 210 requests, the verification of the platform configuration by the second challenger 210 is going to fail even if the configuration of the platform is valid.

Referring to FIG. 2, the first challenger 205 sends a request for the platform configuration from the platform agent 220 (step 230), which then extends a PCR on the resident TPM 225 (step 235) and then requests for the signed value of the PCR from the TPM 225 (step 240), which sends back a signed PCR value, (signed by the TPM 225 with an AIK), back to the platform agent 220 (step 245). The first challenger 205 then receives the platform configuration from the platform agent 220 (step 250). Note that in this process (step 250) the first challenger 205 would normally also receive the signed PCR value and an SML entry, (neither of which are shown in FIG. 2), and use the platform configuration data, the signed PCR values, and the SML entry that are received, to verify the platform configuration (step 255).

Separately, the second challenger 210 could request (step 260) and later receive (step 280) the platform configuration from the platform agent 220, which extends the same PCR (step 265) in the TPM 225, and requests (step 270) and then receives (step 275) signed values of the PCR from the TPM 225. The second challenger 210 then could verify the platform configuration (step 285) that it received. The first challenger 205 and the second challenger 210 may be unaware of each other, and since the current TCG specifications do not specify a systematic method to assign which PCRs can be used to record the measurement digests that are appropriate and useful for different challengers in a secure and privacy-protective way, the same PCR may be used to record the measurement digests for both of these unrelated challengers. This creates a problem where the second challenger 210 may not necessarily be aware of the system state as represented by the PCR values that are extended with the measurements intended for the first challenger 205. Thus, in the point of view of the second challenger 210, unless it already tracks the fact that the same PCR has been extended because of the measurement and verification for first challenger 205, the second challenger 210 may compare wrong sets of data in its verification process because it may not receive all of the SMLs that are required to recreate the order of the PCR extension that took place before its own verification of the PCR. Alternatively, because such SMLs may become too big after many iterations of the PCR extension, the second challenger 210 may simply run out of processing capability to process of all of the previous SML entries to recreate the most recent previous state of the PCR.

The TCG procedure of FIG. 2 can also create leakages of private information that may be allowed to be disclosed to one challenger but not to others. Also the current procedures can create unwarranted verification, (when verification should not happen), or an unintended decision of non-verification, (when verification should happen), may occur on the challengers' sides. Currently, this problem is addressed by using one or more of the following approaches:

Reserving PCRs: As the state of the system is represented using the PCRs, certain PCRs can be assigned to certain applications. The disadvantage with this approach is that the number of PCRs in the TPM is usually around 16, (the TCG standard does not limit the number of PCRs), based on the cost and size considerations. This limits the ability to assign fixed PCRs to each application type.

Using PCR Event Log: Any changes to the PCR values are logged by the TPM. This log can be used along with the PCR values to see if the system is in correct state. However, the problem with this approach is that the log might contain information that is not directly relevant to the application in question and hence can compromise the user privacy.

Loading all applications during startup in a predetermined order also eliminates this problem. However, the startup times will be longer as all the applications have to be verified and loaded during startup making this approach non-practical to use.

These approaches have serious limitations, either in terms of limiting the functionality of the trusted platform or in terms of loss of privacy of the user.

SUMMARY

The present invention is related to a method and apparatus for using TPMs for integrity measurements of multiple subsystems. The state of the PCRs after boot up is stored as the base state of the system. Base state in this context is defined as the state of the system when the startup of the system is complete and can only be changed when new software is loaded at the kernel level. This state itself might be reported to challengers who are interested in verifying the integrity of the operating system (OS).

In another embodiment of the present invention, a virtual PCR is used where such a virtual PCR uses a larger memory space than a conventional TPM provides for a physical PCR, by use of encrypted storage on external, protected memory.

In yet another embodiment of the present invention, an application that is to be verified requests that its state be extended from the base state of the system. When such a request is received, the state of the system is extended directly from the base state PCR contents and not from the system state.

Furthermore, statements about the base states that serve as a reference starting point for measurements and verification of system states are delivered to a system and stored in the form of reference base state certificates. Measurements are performed where results of the measurement of the system's state, (typically in a digest form), are compared to the base state values described in such certificates, and a statement, instead of the raw measurement digest values, are extended to either a physical PCR or a virtual PCR.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Figure 3:
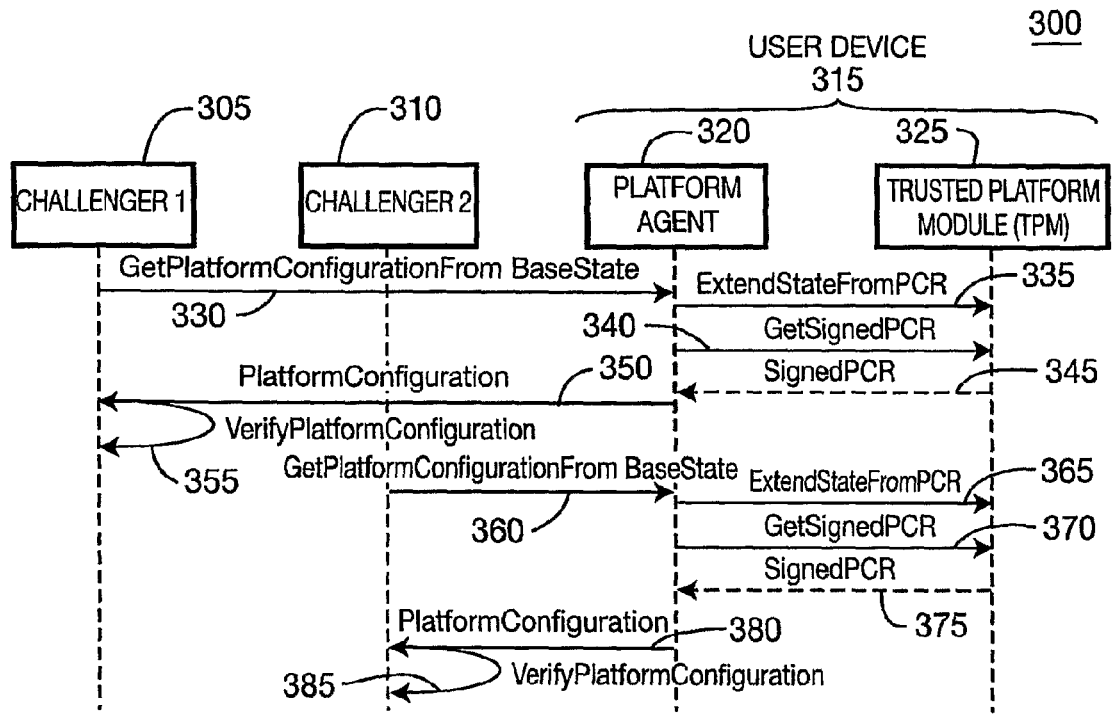
FIG. 3 shows a TCG procedure implemented in a system including two challengers and a user device using a state extension from a common base state in accordance with the present invention.
Figure 4:
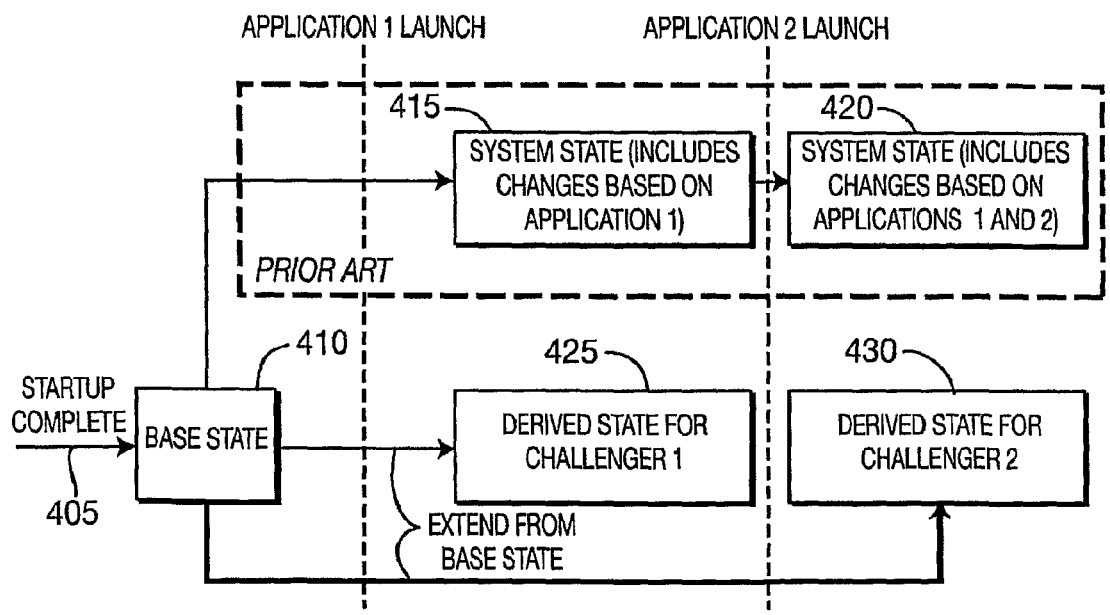
FIG. 4 compares the prior art to the present invention whereby different extended states are implemented for different challengers.

FIGS. 3 and 4 show signal diagrams in which PCRs are retrieved with respect to a base state according to the present invention.

FIG. 3 shows a TCG procedure implemented by a system 300 including a first challenger 305, a second challenger 310 and a user device 315 including a platform agent 320 and a TPM 325, whereby a state extension from a common base state is used. Referring to FIG. 3, the first challenger 305 requests for the platform configuration that is computed from a base state (step 330) from the platform agent 320, which then extends (step 335) from the base state the PCR on TPM 325, and then requests for (step 340) the signed value of the PCR from the TPM 325, which sends back (step 345) the signed PCR value back to the platform agent 320. The first challenger 305 then receives the platform configuration (step 350) from the platform agent 320. The first challenger 305 then compares the platform configuration data it received in step 350 with a value that it computes itself and verifies the platform configuration (step 355).

Figure 1:
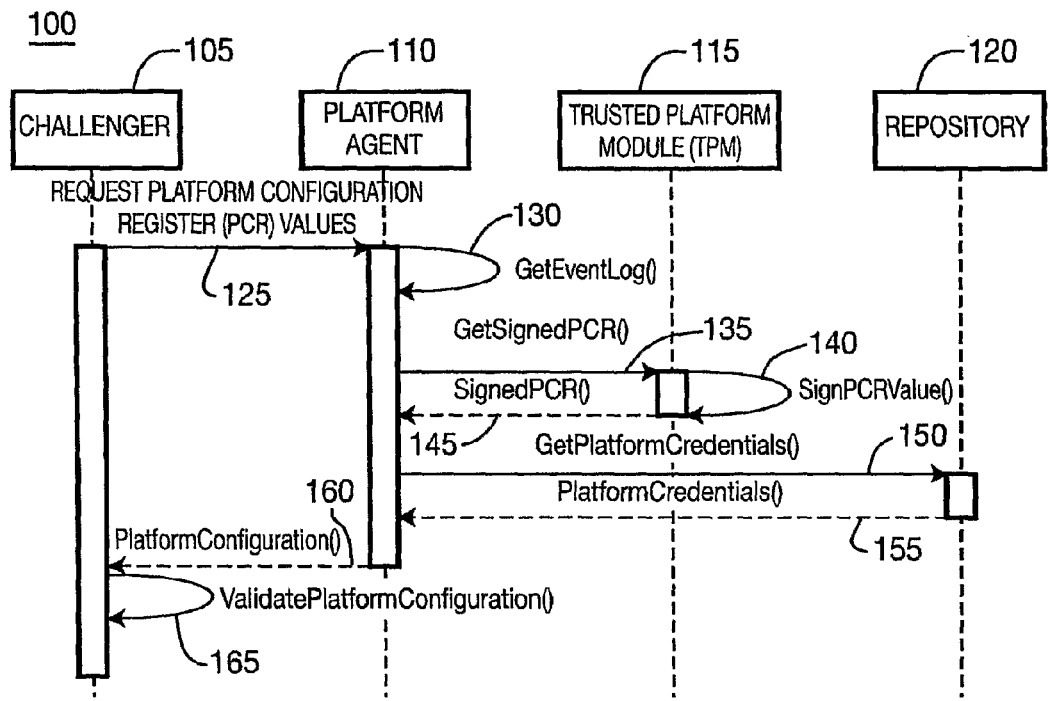
FIG. 1 shows a conventional TCG attestation procedure implemented in a system including a challenger, a platform agent, a TPM and a repository.
Figure 2:
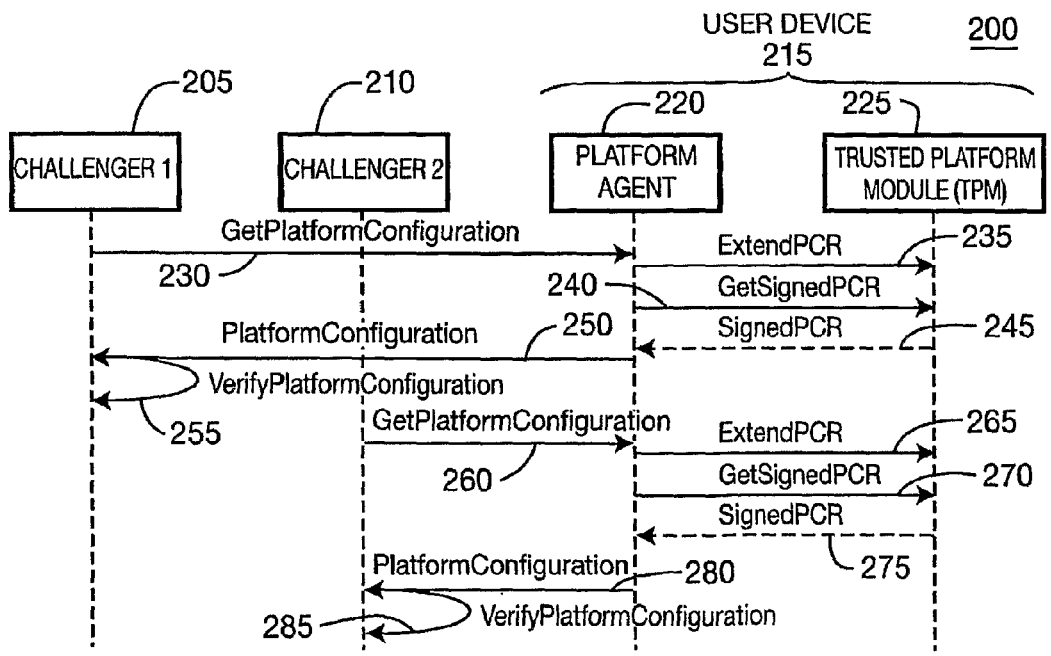
FIG. 2 shows a conventional TCG procedure implemented in a system including two challengers and a user device whereby different applications extend a PCR from different states, unaware of each other's extend operation.

Separately, the second challenger 310 could later request (step 360) and later receive (step 380) the platform configuration computed again from the same value of the base state that is used in the step 335 but then is extended with a different measurement value, appropriate for the second challenger 310 and its verification target and purposes. Thus, the platform agent 320, upon request from the second challenger 310, would then extend the same PCR (step 365), not from its last value but again from the same base state used in step 335. The platform agent 320 then requests (step 370) and receives (step 375) signed values (signed by the TPM 325 with an AIK) of the PCR from the TPM 325. The second challenger 310 then could verify the platform configuration (step 385) that it received. Since the first challenger 305 and the second challenger 310 both received their platform configuration data as independently computed from the base state but with their own measurement values, the procedures described in FIG. 3 can avoid the problems described in the conventional procedure of FIG. 2.

FIG. 4 compares the prior art to the present invention whereby different extended states are implemented for different challengers. As shown in FIG. 4, a system is depicted to have completed start-up 405 and have reached a base state 410. In the prior art, when a first application is loaded and then is verified by a challenger, the system state 415 is changed to reflect the loading of the first application. Next, when a second application 425 is loaded and needs to be verified by another challenger, the system state 420 now will reflect a change from the system state 415, not from the base state 410.

In accordance with the present invention, since PCRs, (or virtual PCRs), that are allocated for different challengers would all be extended from the base state, all challengers would verify their target state with only the net effect of the loading of the applications that they specifically need to verify. Two such challengers, challenger 1 and challenger 2 are depicted in this example, and they would both verify their derived target states, (derived state 425 for challenger 1 and derived state 430 for challenger 2), as independently extended from the base state 410.

In accordance with a first embodiment of the present invention, the TPM resets the PCR values to their default values during reboot of the system. The system referred to here is any platform such as a personal computer (PC), a personal data assistant (PDA), embedded system, mobile phone, peripherals with embedded systems, network elements, and other platforms that are equipped with TCG technologies, specifically functions and services enabled by or enabling the use of a TPM or equivalent entities. The PCR values are reported with respect to a known base state of the TPM. This base state of the TPM is preferably stored in the TPM and can be used whenever a new application has to be measured. The base state of the TPM can represent the platform state when the system boot process is complete and the state for each application is calculated with respect to this base state.

A base state of a TPM is a different concept than a base state for a system. In accordance with the present invention, additional functionalities of the current TPMs are defined so that they won't reset all of the PCR values at boot-up, and instead would have certain values that can represent the 'state of the TPM upon a successful boot-up' as 'base state of the TPM' and store such values in the shielded non-volatile memory inside the TPM itself. Note that such a non-volatile memory is different than the PCR, which again, resets upon boot-up. Since the base state of the TPM is a value that represents the state of the TPM upon a successful boot-up of the system that houses the TPM, such a base state can represent, indirectly, a 'clean' state of the system itself. Furthermore, such a TPM base state would be non-volatile, and can be brought back upon boot-up, to serve as the base state for extend operations of the PCRs. Additional shielded, (i.e., protected), non-volatile memory is needed to store the base state inside the TPM, and also an indication from the transmission control protocol (TCP) software stack (TSS) to indicate that the current state has to calculate from the base state of the system.

TSS is the software stack that enables initiation and control of such procedures for integrity measurements and reporting as well as verification, (e.g., steps 330, 335, 340, 345 and 350, depicted in FIG. 3), that take place outside of the TPM but inside or under the control of the platform itself, (such as the platform OS), or its agents, (i.e., platform agent 320 in FIG. 3).

In accordance with the first embodiment, a TPM base state, is stored securely in the TPM itself, and is known through TSS upon boot-up to the outside of the TPM, i.e., to the platform agent or the platform OS, so that the challengers can use such 'TPM base states' as the reference base state from which integrity measurements of the applications that the challenger needs to verify can be constructed. Only a fixed amount of memory capacity is required in the TPM, (equal to the number of PCRs that the TPM contains). This known base state is used whenever a new application is loaded by the system, thereby allowing the integrity measurements to work the way they were intended. For example, when the TPM has an X number of PCRs, there are also X number of 'TPM base states', one each for each of the X number of PCRs. The stored TPM base states are used to extend each of the PCRs, each allocated to measure the integrity of a particular, loaded application. Therefore, the integrity of the loadings of at most X different applications may be tracked and measured in this manner.

In accordance with a second embodiment of the present invention, there is no fixed size restriction on the number of PCRs a system might have. However, practically the number in most implementations is approximately 16 PCRs. The extensibility in terms of PCR identification numbers, (PCR address can range from 0 to $2^{32}-1$, with values above $2^{30}$ reserved for future use), can be used to create the concept of virtual PCRs that are not physically present on the TPM but are virtual in nature. These virtual PCR contents can be stored as encrypted data on external storage or on the TPM itself. The contents of these virtual PCR values can be extended only from other PCR values. This allows applications to define a base state based what the PCR values can be extended. Each application is preferably given virtual PCR number(s) that it can use to perform integrity measurements. This allows allocation of PCR numbers to applications something similar to allocation of port numbers to well known Internet applications.

Thus, in accordance with the second embodiment, encrypted, protected storage space that a platform can create, is used with the cryptographic functionality of the TPM, as substitutes for the hardware-implemented PCRs. Since the address space reserved for the PCRs is quite large, on the order of $2^{32}$, one could just use the address space to designate any cryptographically protected memory element in the platform's system, (such as random access memory (RAM)), as a substitute for the PCR. This way, one could have many more such 'virtual PCRs' than real, hardware PCRs. Therefore, one could also use such many more 'virtual PCRs' to track the integrity of many more application loadings and other 'measurement-worthy' events.

In accordance with a third embodiment of the present invention, all of the PCR contents are reset during system startup. As in the second embodiment described above, if there are many virtual or real PCRs, the PCR(s) assigned to the application are preferably computed from the initialized state directly. This would require fixed PCR assignments to applications but would not require and the base state to be stored.

In accordance with the third embodiment of the present invention, when one has numerous real or virtual PCRs in a system, one can basically partition them into groups, and each group of PCRs would then be pre-allocated to track the integrity measurements for just one application, and no other applications' measurements can be recorded in any of the real or virtual PCRs that do not belong to the group to which the particular application is assigned. This way, even when all of the PCRs are reset, and there is really no special 'base state' from which to construct the history of the integrity measurements, one PCR may be used from each group as the state-holding space for the post-boot, 'clean, initial state' of the system, and then use the other PCRs in the same group to record detailed snapshots of the histories of the events, (such as loading of different versions of the same application), in a pre-determined, sequential manner. Thus, one may not need to extend all events into the same PCR, but rather, just record the snapshots of such extensions into different PCRs without actually extending the individual PCRs. Furthermore, one can create, using a large number of PCRs (all belonging to the same group) and their values, and the knowledge of the order of the updated PCRs, a historical log of the integrity measurement digests whose snapshots are kept in each of the PCRs belonging to that group, applicable to only that particular application's history with the platform.

Figure 5:
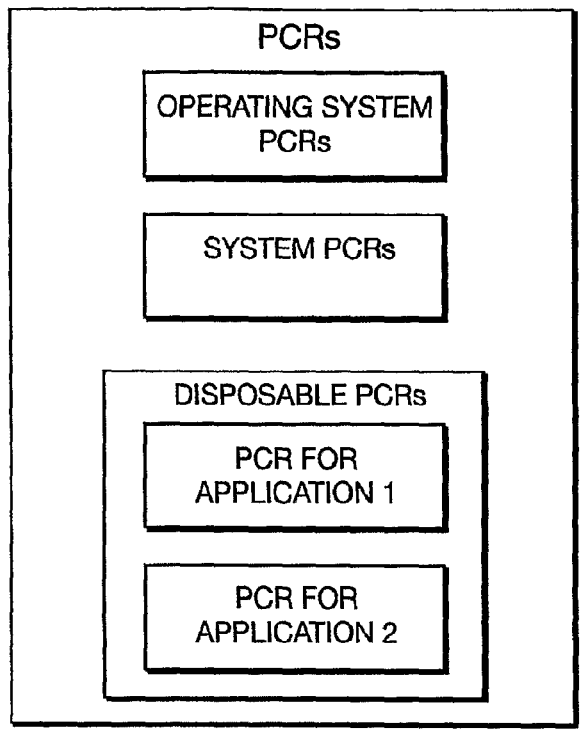
FIG. 5 shows allocation of different extended states on different PCRs in accordance with the present invention.

FIG. 5 shows such a PCR configuration in which PCRs for Application 1 and Application 2 are disposable. The PCR contents can be reset every time the application needs to be measured and the PCR contents would be extended from this initialized state. The contents of the PCRs assigned to operating systems and drivers along with the PCR values computed for the application can be sent over to the challenger for verifying the integrity of the system.

All of the three embodiments presented above assist challengers in verifying whether the platform state is what it is supposed to be without compromising on the privacy of the user.

All three of these embodiments can also be augmented with the use of a reference integrity metric (RIM) certificate. A conventional RIM certificate is defined as a particular method for providing statements for the boot-up process for mobile phones. The conventional RIM certificate contains a statement about a reference state that a system should attain after a boot-up. After a boot-up, if the system determines that it has reached the same state as specified in the RIM certificate, then the system requests the TPM to update its PCR0, (the first PCR), to contain the value of the SHA hash operation of the statement, which states the attained state that is also verified.

In accordance with the present invention, a reference base state (RBS) certificate is used. Unlike the conventional RIM certificate, which can provide a statement for only a single, common post-boot-up state of the OS of the platform that is commonly applicable to all applications, the new RBS certificate is used to provide statements about application-specific reference base states. This difference in concept also results in the fact that, for a system that uses RBS certificates, a platform can, at any given time, accommodate multiple different RBS certificates, each specifying the base state for different applications or application groups. This contrasts with a system that just supports a RIM certificate, whereby at any given time, the platform can only work with one RIM certificate. Again, one could have multiple RBS certificates, each tailored to specify the reference base states for events, (such as loading), of many different applications, and each being accommodated and used by the platform for application-specific base-state referencing on a simultaneous time basis. In terms of PCRs, each RBS certificate would require at least one PCR, (either real or virtual), dedicated to it. Such a dedicated PCR, per each RBS certificate, would be used to record the hash value of a statement that the platform OS constructs to indicate information about the verification or non-verification status of the check between the system's actual state and the base state. The hash value would be recorded upon verification by the platform agent with the aid of the TPM, of the equality of the system's actual state to the base state that is indicated in a state-related statement contained in the RBS certificate.

An example of such a statement could be: "The actual system state and the base state are verified to be the same". The hash of such a statement, which is now recorded in the dedicated PCR for that RBS certificate, can provide a starting point for further extend operations for that dedicated PCR, as well as any other PCRs that may be used for integrity measurement verification of the assigned application or application groups. Note that an RBS certificate also contains the hash value of such a 'state-checking statement' that is constructed. Thus, by comparing the result of the hash operation, performed on the statement that is constructed by the platform OS to indicate whether the system state matches the base state, with the hash value of the same statement contained in a different part of the same RBS certificate or contained in a different RBS certificate, the platform OS is provisioned with a means to extend the PCRs that are assigned for the integrity measurement digest storage for specific applications or application groups, from an externally verifiable starting point value. Again, that value is the SHA-1 hash of a statement concerning the check between the system's actual state and the base state indicated in the associated RBS certificate.

A RIM certificate conveys information about the integrity metric of core OS software and relevant information for such OS, such as the version number. A particular PCR of the platform's TPM, namely, the PCR0, then is assigned to carry the 'check or no-check' statement for the RIM certificate after the integrity reference values contained within the certificate is checked against real measurements.

The base states used by the present invention may contain different 'state check statements' that may be compared against statements included in various different certificates. Each of these certificates may include information about different base states, each belonging to a particular application or application groups or other contexts.

Figure 6:
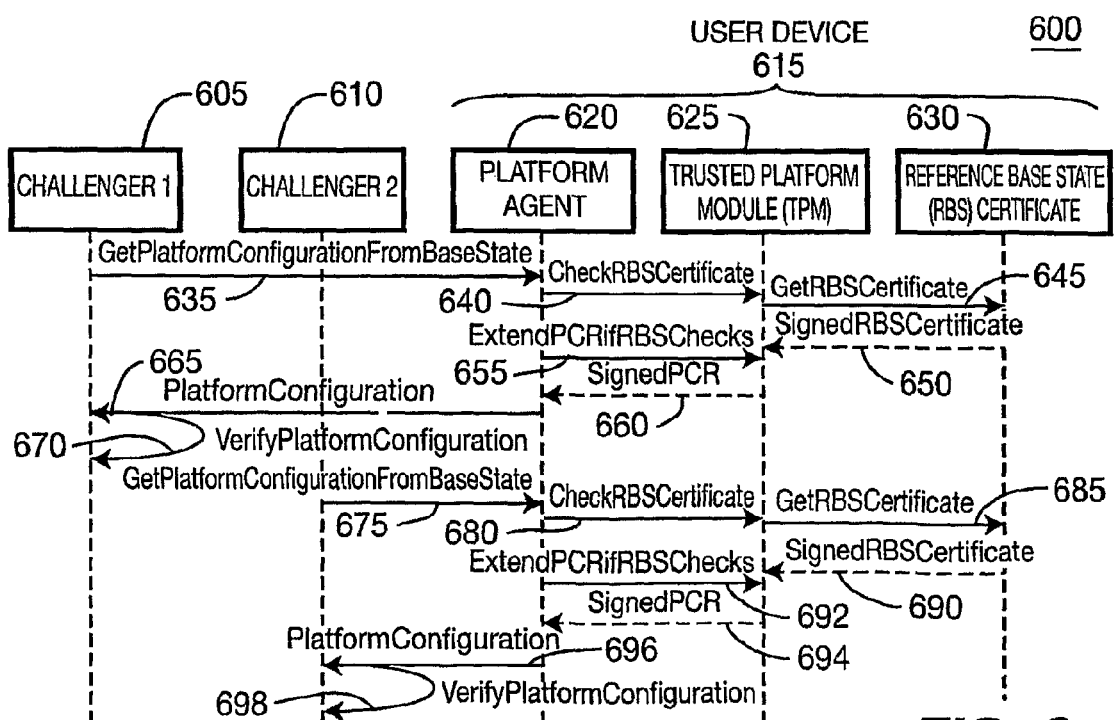
FIG. 6 shows a TCG procedure implemented in a system including two challengers and a user device using a base state extension with reference base state (RBS) certificates in accordance with the present invention.

FIG. 6 shows a TCG procedure implemented by a system 600 including a first challenger 605, a second challenger 610 and a user device 615 including a platform agent 620, a TPM 625 and a RBS certificate 630. As shown in FIG. 6, the first challenger 605 can issue a command to the platform agent 620 to get the platform configuration computed from a starting configuration specified by a base state (step 635) applicable to the loaded application of which the first challenger 605 is interested in verifying the integrity. The platform agent 620 then issues a command (step 640) to the TPM 625 to check the RBS Certificate applicable to which application that the first challenger 605 wants to verify the integrity status. The TPM 625 obliges and issues a command to get the RBS Certificate 630 (step 645) from a certificate repository that the TPM 625 controls. The TPM 625 gets the RBS Certificate 630 (step 650) which is also signed. The platform agent 620 then issues a command to the TPM 625 (step 655) to perform a verify-and-extend operation. In this operation, the TPM 625 extends a specific PCR, (either real or virtual), controlled by the TPM 625 and specific to the application that is being integrity verified for the first challenger 605, but only after it verifies that the hash of a statement, which the platform agent 620 constructs after verifying that the system's state and the base state, (indicated in the RBS certificate), are the same, is the same as the hash value contained in the RBS certificate. The TPM 625 then signs the PCR value with an AIK and sends it to the platform agent 620 (step 660). The platform agent 620 then can send the platform configuration information, including the signed PCR values, to the first challenger 605 (step 665). The first challenger 605 then can verify (step 670), using the platform configuration data it received from the platform agent 620, whether the application it is interested in has been loaded correctly and without compromise to the application from the correct base system state as indicated in the RBS certificate.

When another challenger, (i.e., the second challenger 610), wishes to verify the integrity of an application in which it is interested, it can perform in a similar fashion, essentially the same procedures (steps 675 and 698) with the help of the platform agent 620, (which performs steps 680, 692, and 694), and the TPM 625, (which performs steps 685, 690 and 694), but using a different RBS certificate, this one specific to the application in which that second challenger 610 is interested in.

FIG. 6 depicts the augmentation of the second embodiment with a proposed RBS certificate. Virtual PCRs are used to store information about the base states; not by storing the actual integrity measurements that need to be extended, but by storing statements of 'check' or 'no check', as with the current usage of RIM certificates in mobile trust modules (MTMs). Note that, instead of unilaterally extending the PCR, a different command, (i.e., that extends PCR if a simulated extend result checks the state contained in the RBS Certificate), should be used. Furthermore, the value extended in the PCR is not the actual measurement results, but a statement stating whether a 'check' or a 'no check' event has occurred when the comparison of the real extension and the state information contained in the RBS certificate has been made.

Note that in FIG. 6, the different challengers can use, for verification of challenger-specific configuration verification, either a common, single RBS Certificate, or different RBS Certificates, one for each of the specific challengers.

There are certain aspects in the procedure used by the remote entity to request the state of the system that are not defined by the standard. One such aspect is how the remote entity can request for the measurements.

Figure 7:
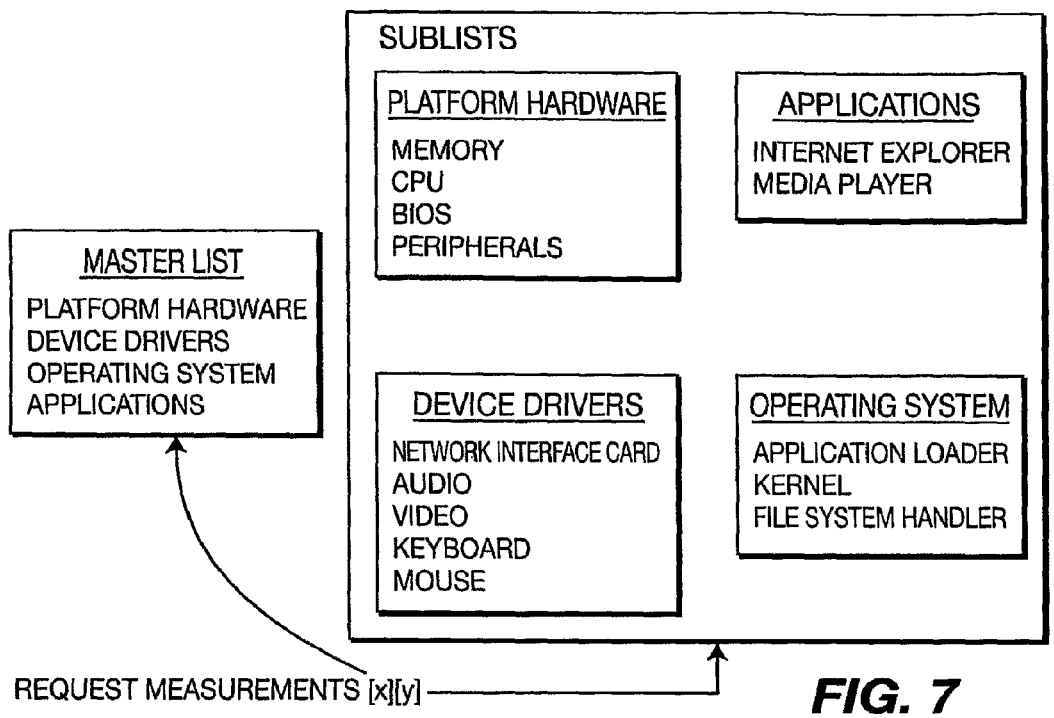
FIG. 7 illustrates selective requests for measurements in accordance with the present invention.

FIG. 7 shows a block diagram for an embodiment using a master list and sublists. The requester preferably identifies the exact measurements it needs by choosing one or more entities from the master list and then choosing one or more elements from the sublist for which it would like to receive measurements. If there is no sublist specified, it can be assumed that the measurement values for all of the entities in the master list are sent to the requester. The request can be of the form request[x] [y], where x represents the identification information for the master list, and y identifies the elements in the sublist. As noted earlier, y is an optional element in the request structure. This request can be made using any mechanism including the use of languages like extensible markup language (XML) to communicate the elements of the master list and sublists.

The XML example shown below is used to request the measurement values for Internet Explorer and Media Player Applications.

1. <?xml version="1.0" encoding="UTF-8" ?>
2. <RequestPCRValues>
   i. <MasterList>
     ii. <Id>Applications</Id>
       1. <SubList>
     iii. <Id>Internet_Explorer </Id>
     iv. <Id>Media_Player </Id>
       1. </SubList>
     v. </MasterList>
3. </RequestPCRValues>

Based on the disclosed embodiments, virtual PCR numbers are assigned to the applications. These values are preferably any identifier, (e.g., globally unique identifier (GUID) or universally unique identifier (UUID), and the like), and a mapping table between the TPM and the real PCR assignments is preferably stored in the TPM memory. In this scenario, the application requesting the PCR values does not know of the PCR values assigned to the application, and performs a request using a unique identifier that is valid across multiple platforms.

Figure 8:
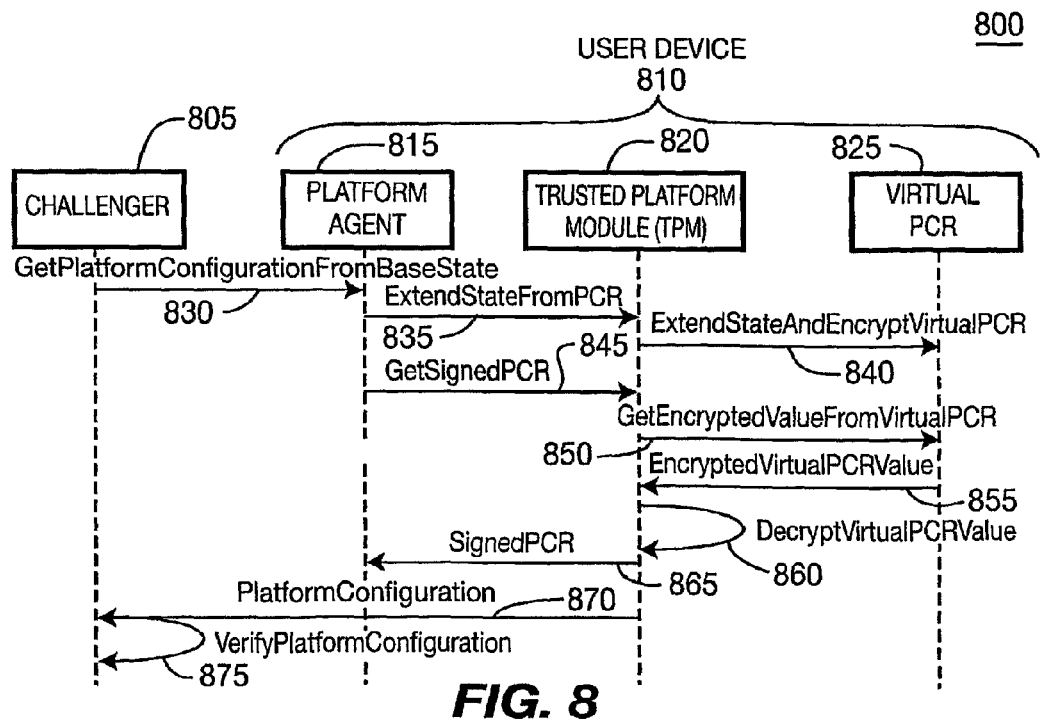
FIG. 8 shows a virtual PCR that uses external memory protected by encryption capability of a physical TPM, and how a system that has a TPM and a virtual PCR can be used to supply data for platform configuration integrity verification by a challenger in accordance with the present invention.

In relation to the methods depicted in the above, FIG. 8 shows how a user device system that has a TPM and virtual PCRs can be used to supply data for verification of the platform configuration integrity to a challenger. FIG. 8 shows a TCG procedure implemented in a system 800 including a challenger 805 and a user device 810 including a platform agent 815, a TPM 820 and a virtual PCR 825. Note that the user device system can have virtual PCRs, to the order of $2^{32}$.

As shown in FIG. 8, the challenger 805 requests (step 830) the platform agent 815 to get the platform configuration data which will later be used for verification of the platform's integrity. The platform agent 815 issues a command (step 835) to the TPM 820 to extend a PCR from a reference base state. The platform agent 815 may not necessarily have to specify whether the PCR it wants the TPM 820 to extend is a physical PCR or a virtual PCR. The TPM 820 then extends the value of the virtual PCR and encrypts the virtual PCR 825 with its new extended value with an encryption key that is stored within the TPM 820 itself or a key that is stored outside of the TPM but is protected by a key stored within the TPM 820 itself (step 840). The platform agent 815 later commands the TPM 820 to sign the value of the PCR and send it to the platform agent 815 (step 845). The TPM 820 then accesses the virtual PCR 825 and gets the encrypted PCR value from the virtual PCR 825 (steps 850 and 855). The TPM then decrypts (step 860) the encrypted virtual PCR value. The TPM 820 then signs the decrypted virtual PCR value, re-encrypts it, (with a different key than the challenger 805 has), and sends it (step 865) to the platform agent 815. The platform agent 815 composes platform configuration data, including the data from the virtual PCR 825, and sends it to the challenger 805 (step 870). The challenger 805 then uses the received platform configuration data to verify the integrity state, (or state of the platform configuration), of the user device 805 (step 875).

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A user device comprising:
   a memory in which a certificate repository is implemented, the certificate repository having a plurality of signed reference base state (RBS) certificates, each signed RBS certificate being associated with an application and comprising (1) a base state that is specific to the associated application and (2) a hash value of a statement indicating whether an actual system state of the user device matches the base state of the associated application;
   a platform agent configured to get a platform configuration associated with a loaded application for which a challenger is interested in verifying an integrity, wherein the platform configuration is computed using the base state of the signed RBS certificate, of the plurality of signed RBS certificates, for the loaded application, and wherein the platform agent is further configured to construct another hash value, the another hash value of another statement indicating whether a second actual system state of the user device matches the base state of the associated application contained in the RBS certificate; and
   a trusted platform module (TPM) configured to obtain the signed RBS certificate from the certificate repository, and extend a platform configuration register (PCR) that is (1) dedicated to the signed RBS certificate, controlled by the TPM, and (2) associated with the loaded application, after verifying that the hash value of the signed RBS certificate is the same as the another hash value constructed by the platform agent, wherein the TPM is further configured to sign a PCR value with an attestation identification key (AIK), and send the signed PCR value to the platform agent.

2. The user device of claim 1 wherein the platform agent is further configured to send platform configuration information, including the signed PCR value, to the challenger.

3. The user device of claim 2 wherein the challenger is configured to verify that the loaded application associated with the signed RBS certificate was loaded from a correct base state as indicated in the signed RBS certificate.

* * * * *

UNITED STATES PATENT AND TRADEMARK OFFICE
CERTIFICATE OF CORRECTION

PATENT NO. : 8,566,606 B2  
APPLICATION NO. : 12/297966  
DATED : October 22, 2013  
INVENTOR(S) : Movva et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 866 days.

Signed and Sealed this

Fifteenth Day of September, 2015

Michelle K. Lee
*Director of the United States Patent and Trademark Office*